United States Patent [19]

Souther

[11] 4,346,467
[45] Aug. 24, 1982

[54] LINEAR TRACKING TONE ARM

[76] Inventor: Louis C. Souther, 429 York St., Canton, Mass. 02021

[21] Appl. No.: 220,422

[22] Filed: Dec. 29, 1980

[51] Int. Cl.³ .............................................. G11B 3/36
[52] U.S. Cl. ...................................... 369/249; 369/244
[58] Field of Search ............... 369/219, 220, 221, 224, 369/244, 249

[56] References Cited

U.S. PATENT DOCUMENTS

| | | | |
|---|---|---|---|
| 2,219,230 | 10/1940 | Krause | 369/249 |
| 2,346,071 | 4/1944 | Guedon | 369/249 |
| 2,350,490 | 6/1944 | Berliner | 369/249 |
| 2,676,808 | 4/1954 | Masterson | 369/249 |
| 2,869,877 | 1/1959 | Bard | 369/249 |
| 3,156,472 | 11/1964 | Brock | 369/244 |
| 3,390,886 | 7/1968 | Robinow | 369/249 |
| 3,418,435 | 12/1968 | Norris | 369/249 |
| 3,734,511 | 5/1973 | Robinow | 369/249 |
| 3,993,316 | 11/1976 | Fairbanks | 369/249 |

Primary Examiner—Steven L. Stephan
Attorney, Agent, or Firm—Joseph S. Iandiorio

[57] ABSTRACT

A linear tracking tone arm mechanism for a record turntable including a housing having means for engaging the spindle of a turntable and means for mounting to the turntable to support the housing above the turntable; an elongate, generally horizontal track mounted to the housing and extending longitudinally in the direction generally between the means for engaging and the means for mounting and having a forward race and a parallel rearward race; a carriage including first and second rear rollers for engaging the rear race and a forward roller for engaging the forward race; a tone arm; and means for mounting the tone arm to the carriage.

24 Claims, 15 Drawing Figures

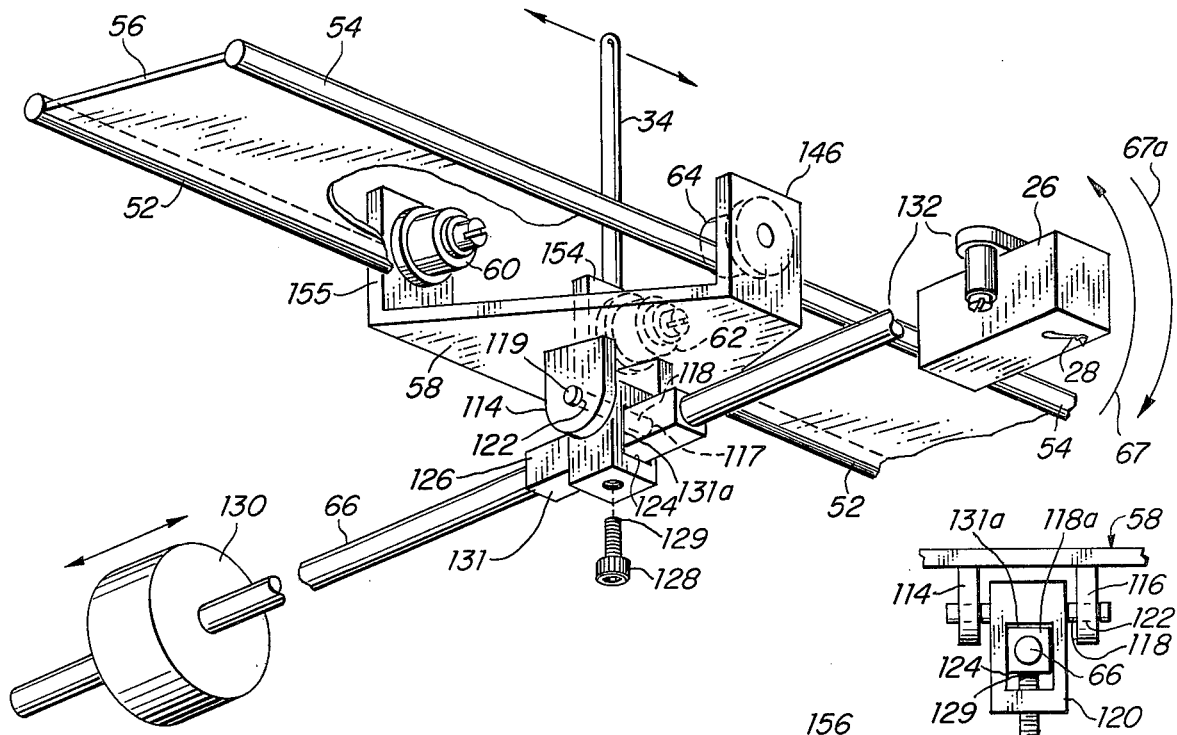
FIG. 7.
FIG. 7A
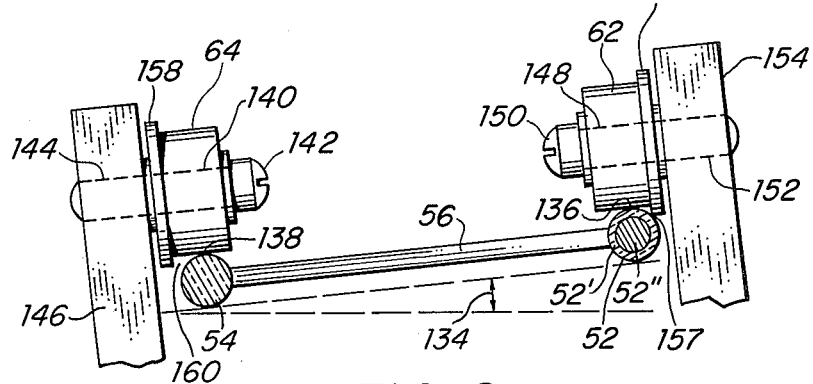
FIG. 8.
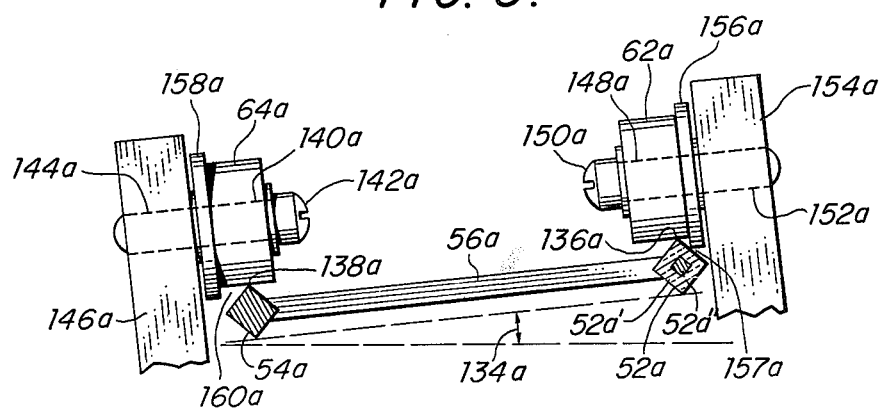
FIG. 9.

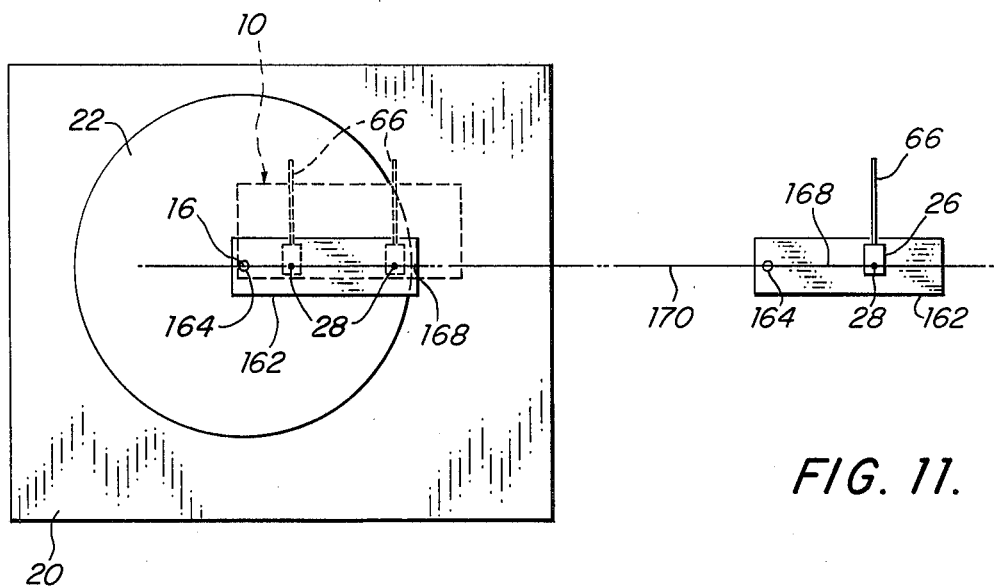
FIG. 10.
FIG. 11.
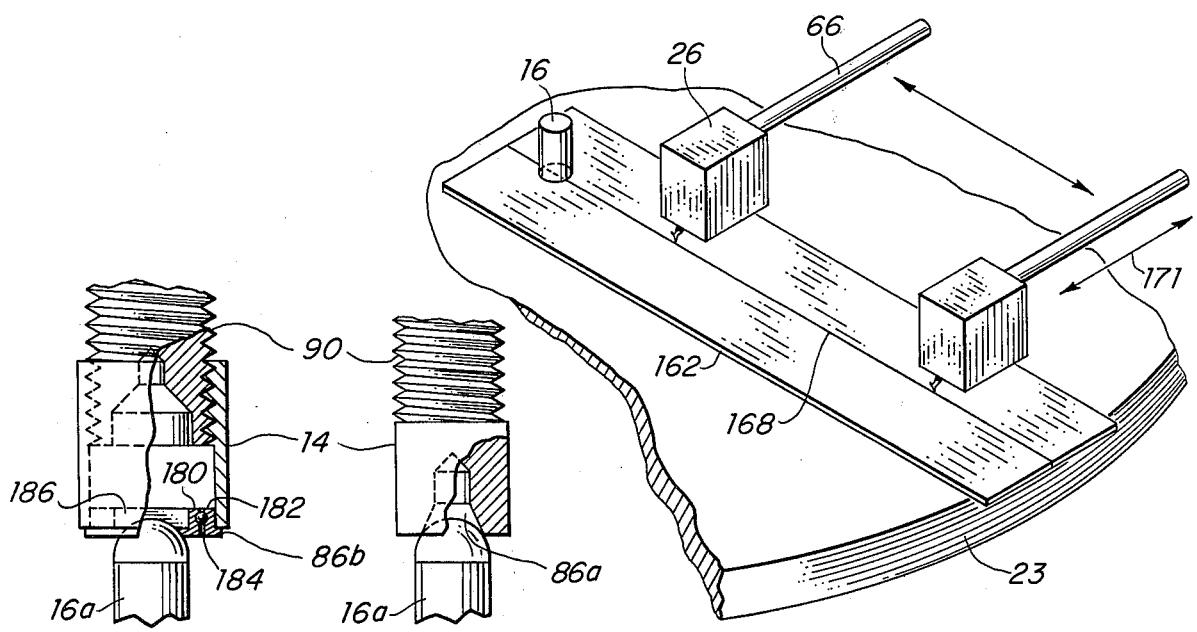
FIG. 12.
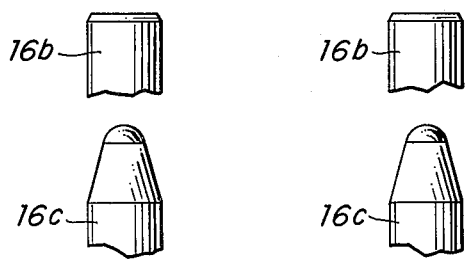
FIG. 13.　　FIG. 14.

LINEAR TRACKING TONE ARM

FIELD OF INVENTION

This invention relates to an improved linear tracking tone arm mechanism for a record turntable.

BACKGROUND OF INVENTION

In a conventional record player the pivotable tone arm and its stylus or needle or cartridge is driven inwardly across the record as the record rotates. The path that the stylus end of the tone arm describes is a circular arc and that arcuate path causes the stylus to engage the groove at a slightly different angle on each rotation of the record, resulting in undesirable distortion. To eliminate this distortion the stylus end of the tone arm should trace a linear, radial path across the groove, thereby engaging the groove tangentially on each rotation. This imitates the linear manner in which record grooves are cut as disclosed in U.S. Pat. No. 4,135,772 and the references cited therein.

Typically in conventional linear tracking devices, the tone arm is controlled by an electric, electronic, photoelectric or other device. Such tracking mechanisms are complex, expensive, and subject to electrical failure. Further, these tone arms operate to maintain a linear path only after the stylus has deviated from such a path; e.g., instead of maintaining a perfect linear alignment they merely correct continuous deviations by pulling the stylus back into linear alignment.

Purely mechanical devices for linearly tracking the groove of a photograph record have been developed. However, some of these, such as U.S. Pat. No. 3,940,149, also correct alignment deviations only after they occur and thus experience the same problem as comparable electric and electronic devices. Alternatively, mechanical tracking devices have been produced which prevent such deviations. However such devices, as U.S. Pat. No. 2,676,808, were designed for use with older and heavier tone arm devices that have largely been replaced by extremely lightweight devices which apply to the record groove less than one tenth the stylus force as did the older cartridges, thus reducing record wear and producing a higher accuracy of sound reproduction (high fidelity). However, the high rolling friction of such linear tracking devices is too great for present lightweight tone arm devices.

SUMMARY OF INVENTION

It is therefore an object of this invention to provide an improved inexpensive, simpler, linear tracking tone arm mechanism which is wholly mechanical and easy to install and use.

It is a further object of this invention to provide a linear tracking tone arm mechanism which reduces operating friction, accommodates extremely lightweight, low mass, high fidelity tone arms, stylus, and cartridges, reduces record wear, and produces high-accuracy sound reproduction.

It is a further object of this invention to provide a linear tracking tone arm mechanism which does not merely correct stylus deviations from linear tracking of a rotating record groove, but prevents such deviations initially.

It is a further object of this invention to provide a linear tracking tone arm mechanism which is adaptable to virtually all existing phonograph turntables either as original equipment or by retrofitting.

It is a further object of this invention to provide a linear tracking tone arm mechanism which after being adjusted to a linear alignment can be repeatedly swung out of the way or removed and replaced without losing its linear alignment.

This invention features a linear tracking tone arm mechanism which includes a housing having means for engaging the spindle of a turntable and means for mounting to the turntable to support the housing above the turntable. An elongate, generally horizontal track assembly is mounted to the housing and extends longitudinally generally in the direction between the means for engaging and the means for mounting and has a forward track and a parallel rearward track. A carriage includes first and second rear rollers or bearings which engage the rearward track and a forward roller or bearing which engages the forward track. There is a tone arm and means for mounting the tone arm to the carriage.

In a preferred embodiment the bearings ride on top of the tracks and the carriage is located underneath the track assembly. At least the rear bearings may include a flange for bearing on the outer side of the track assembly. The distance between the rear bearing flanges and the front bearing flange may be greater than the lateral distance between the front and rear tracks. The tracks have low-friction surfaces, typically of glass. The tracks may be solid glass and may be of circular or square shaped cross section. The rearward track may be raised slightly higher than the forward track. The means for mounting the tone arm includes releasable gripping means which enables the tone arm to be adjusted along a direction lateral to the track assembly. The means for engaging is adjustable to level the track assembly and the housing may include a level indicator. The means for mounting the turntable includes a pedestal which may be vertically adjustable to accommodate various heights of the turntable. The pedestal may be prepared for screw fasteners, magnetic mounting or other means for mounting to the turntable. A shim or other means is included for raising the outer edge of the turntable so that the end of the track assembly proximate the means for mounting to the turntable is higher than the end proximate the means for engaging the spindle. Pick-up means is included proximate the terminal position of the tone arm on the inner end of the track for lifting the stylus out of the record groove. The pick-up means includes a pair of magnetic elements, one element on the tone arm and the other on the housing. A return tab member extends from the carriage to enable manual movement of the carriage to its starting position or elsewhere (cueing) along the track assemblies. Cam means are included in the housing to bear on the tone arm. An actuator drives the cam means to raise and lower the stylus end of the tone arm. The carriage means includes pivot means for mounting the tone arm and by which the stylus end of the tone arm may be raised and lowered. The means for mounting to the turntable includes hinge means by which the inner end of the housing proximate the means for engaging may be pivotally raised or lowered, i.e. swung up and out of the way for record removal and replacement. An extremely fine and flexible wire is connected from the cartridge end of the tone arm to a position on the housing for interconnection with an audio system.

DISCLOSURE OF PREFERRED EMBODIMENT

Other objects, features and advantages will occur from the following description of a preferred embodiment and the accompanying drawings, in which:

FIG. 7 is an exploded axonometric view of the carriage and tone arm assembly of the mechanism of FIG. 2;

FIG. 7A is an enlarged front view of the tone arm locator of FIG. 7;

FIG. 8 is a cross-sectional view of low-friction track assembly means according to this invention with cylindrical tracks;

FIG. 9 is a cross-sectional view of low-friction track assembly means according to this invention with square tracks;

FIG. 10 is a top plan view of the linear adjusting mechanism and turntable of FIG. 1 showing use of an alignment gauge to set the stylus;

FIG. 11 is a top plan view of the alignment gauge;

FIG. 12 is an axonometric view showing the adjustment operation of the tone arm with the alignment gauge; and FIGS. 13 and 14 are exploded, side elevational views of two alternative spindle locators.

Figure 1:
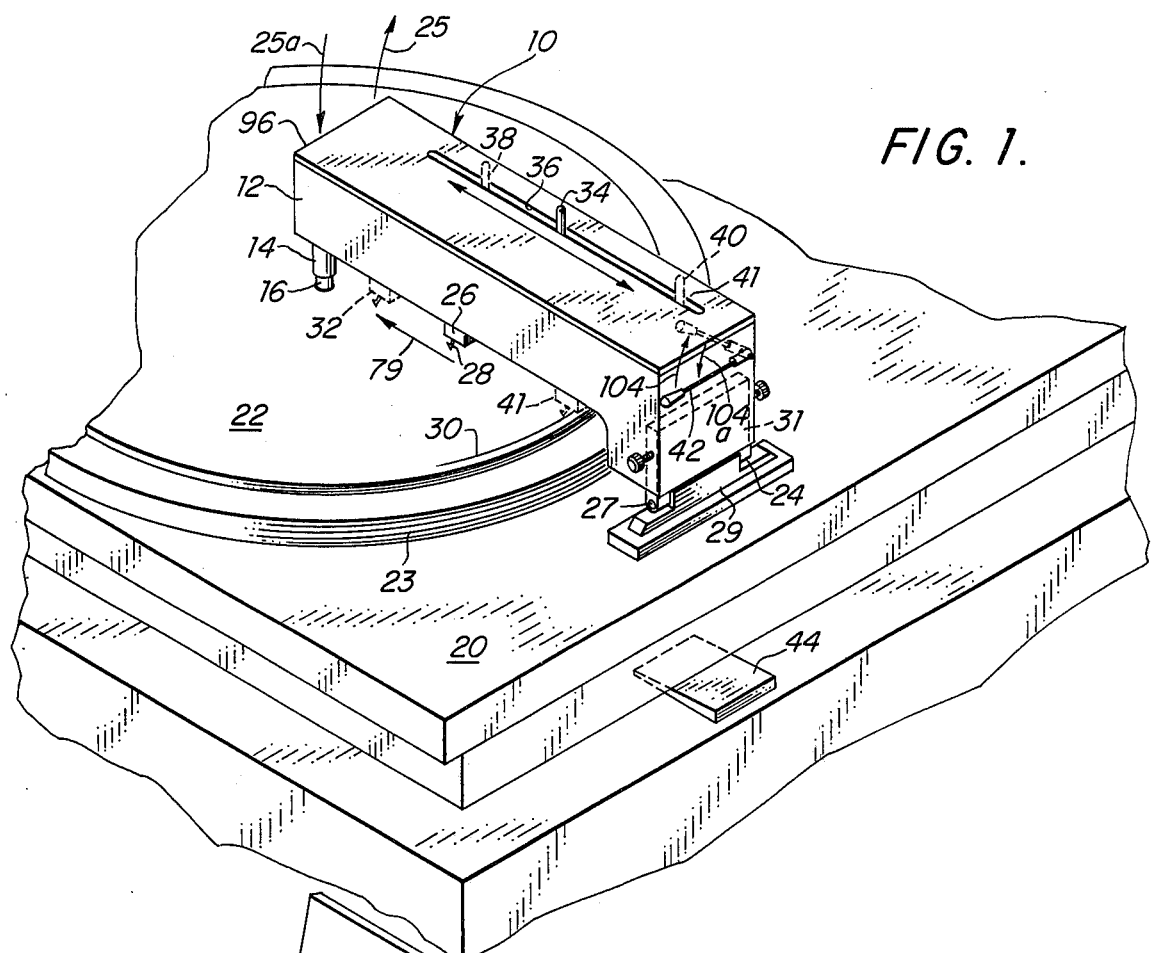
FIG. 1 is an axonometric view of a linear tracking tone arm mechanism according to this invention mounted on a phonograph turntable.

A linear tracking tone arm mechanism according to this invention may be effected using a housing having at its inner end means for engaging the spindle of a turntable and at its outer end means for mounting to the turntable which supports the housing above the turntable. There may be provided a vibration absorber between the means for engaging the spindle and the housing to prevent turntable vibration from reaching the cartridge. The means for mounting may include a pedestal attached to the turntable, e.g. by screws or magnetic attraction, at a point outside the circumference of the record. The means for mounting may be vertically adjustable to accommodate various heights of the turntable rotatable portion. The mounting means may also be hinged to permit pivotal raising and lowering of the inner end of the housing so that the record may be changed. An elongate, generally horizontal track assembly may be mounted to the housing and extend longitudinally generally in the direction between the inner and outer ends of the housing. The track assembly may include forward and rearward tracks. The tracks have a low-friction surface such as glass, metal or plastic, or may be made entirely of one material. The space between the tracks may include a plastic or metal reinforcing spacer or spacers to secure the tracks. The tracks may be simply round or square rods of glass or glass-coated or plated material. There is a carriage having two rear bearings which ride on top of the rearward track and a forward bearing which rides on top of the forward track. The outer edge of at least each rear bearing may have a flange for bearing on the outside surface of the track upon which it rides. The lateral distance between the flanges of the forward and rear bearings is slightly greater than the lateral distance between the two tracks. The bearings are thus loosely fitted to the tracks and capable of slight lateral motion. A preferred bearing is an unlubricated ULTRA precision flanged ball bearing. The carriage may be suspended from the bearings to a position beneath the tracks. In order to provide a minimal contact surface (theoretically a point contact) and less friction between each bearing and the track on which it rides, the track cross section may be circular. Alternatively, the cross section may be square or diamond shaped so that the bearings ride on a sharp edge, providing minimal contact and thus reduced friction. The track assembly may be laterally tilted: the rearward track may be raised slightly with respect to the forward track, resulting in the rear bearing flanges bearing on the side of the rearward track and the forward bearing flange not bearing on the forward track. This rear flange location insures against the carriage cocking or deviating from a linear course on the track. Alternatively, the track may be fully horizontal. A low mass tone arm which may weigh less than two grams is mounted on the carriage by a releasable gripping means so that the tone arm may be adjusted in a direction lateral to the track. A cartridge with stylus is suspended from the tone arm to engage the groove of a phonograph record. The stylus may be a part of a cartridge which is connected to the tone arm. An adjustable counterweight may be added to the tone arm to balance the weight of the cartridge, thereby providing adjustment for stylus pressure on the groove. The counterweight may average three grams and may weigh up to ten or more grams where heavier cartridges are used. The force of the stylus when engaged with the rotating record groove may be as light as or less than one gram.

A straight line gauge may be used to define a linear path from the means for engaging the spindle outward to the circumference of the record. The tone arm may be adjusted laterally to enable the stylus to trace this line. After this adjustment the mechanism may be swung up and out of the way or removed entirely for record replacement without losing its linear alignment. It is preferred that the tone arm maintain a constant angle with the record to maintain the vertical tracking angle of the stylus while the stylus engages its groove. To accomplish this the track is maintained parallel to the turntable surface. This may be done by making the means for engaging the spindle adjustable in order to level the housing and track. This adjustable means for engaging may include a threaded spindle locator, one end of which fits over the spindle, the other end having threads which fit into a threaded receptacle at the inner end of the housing. Clockwise rotation of the spindle locator in the receptacle raises the inner end of the housing and the track. Counterclockwise rotation lowers the inner end. Alternatively, any means which engages the spindle and permits vertical adjustment of the housing and the track assembly is acceptable. The housing may also include a level indicator such as a bubble-type spirit level to indicate whether or not the track is level.

Even in the low-friction embodiment described, some residual friction will remain. To overcome friction effects, the track assembly and the housing may be longitudinally tilted slightly so that the outer end of the track assembly proximate the means for mounting to the turntable (the outer end) is higher than the end proximate the means for engaging the spindle (inner end). This may be accomplished while at the same time maintaining parallel alignment between the track assembly and the turntable by a shim means, inserted under the turntable proximate the means for mounting, which slightly inclines the entire turntable.

The mechanism may further include stylus pick-up means which include a pair of magnetic elements, one of which is attached to the tone arm and the other of which is attached to the housing proximate the inner end of the track and above the tone arm. The housing element may include a vertically and laterally adjustable magnet and the tone arm element may include an iron or steel slug. As the tone arm element passes under the housing element it is attracted to the latter, thus lifting the stylus out of the record groove.

The mechanism may further include a return tab member extending from the carriage for enabling manual movement of the carriage to its starting position or elsewhere as for cueing. The tab member may protrude from a longitudinal slot in either the top, front, or rear of the housing.

Also included may be cam means for raising and lowering the stylus end of the tone arm at any time. The cam means may include an elongate member mounted longitudinally in the housing and having at least one actuating lobe. The member is pivotably mounted to the inner and outer ends of the housing and one end protrudes and is connected with an actuating member which rotates the elongate member between a first position, which raises, and a second position, which lowers, the stylus end of the tone arm.

The carriage includes pivot means which allows the tone arm to pivot vertically but not horizontally. This enables the stylus end of the tone arm to be raised and lowered by the pick-up means or the cam means and additionally allows the tone arm and stylus to "float" over vertical deviations such as warping in the record. An extremely fine and flexible wire may be connected to the cartridge for carrying to an audio system the output signals generated by the cartridge. The wire may include three or more wires, each less than 0.005". This wire is flexible enough to sustain many hundreds of flexings and bendings, while not flickering or breaking electrical continuity from the cartridge to the audio system. The wire will not restrict or restrain the cartridge from crossing the record.

The linear tracking tone arm mechanism 10, illustrated in FIG. 1, includes a housing 12 having a spindle locator 14 mounted on top of a phonograph spindle 16. Housing 12 is connected to a means for mounting 24 to the turntable 20 beyond the edge of record 22 on turntable platter 23. Means for mounting 24 supports the housing 12 above the turntable 20. Means for mounting 24 may include a pedestal 29 which magnetically adheres to turntable 20. Pedestal 24 may as well be attached to a turntable 20 by screws, adhesive, or any other suitable means. Pedestal 24 has an upper plate 31 mounted in housing 12 and attached to a base member 29 by a hinge 27. Raising end 96 of housing 12 in the direction of arrow 25 thus provides access to the spindle 16 for changing records while pedestal 24 remains secured to the turntable. Mounted within housing 12 is a stylus 28 normally supported in cartridge 26 to engage the groove 30 of a record 22. Stylus 28 and cartridge 26 normally move in the direction of arrow 79 when the record is playing. When they have completed traversing record 22 they will be in the position indicated by phantom 32. Return tab member 34 protruding through slot 36 moves with stylus 28 and cartridge 26, and accordingly at the completion of the record play it will be in the position of phantom 38. Tab 34 may then be manually returned to the position of phantom 40, thus moving stylus 28 and cartridge 26 to the position of phantom 41 at the outer edge of record 22. Shim 44 is inserted beneath turntable 20, inclining turntable 20 and housing 12 attached thereto.

Figure 2:
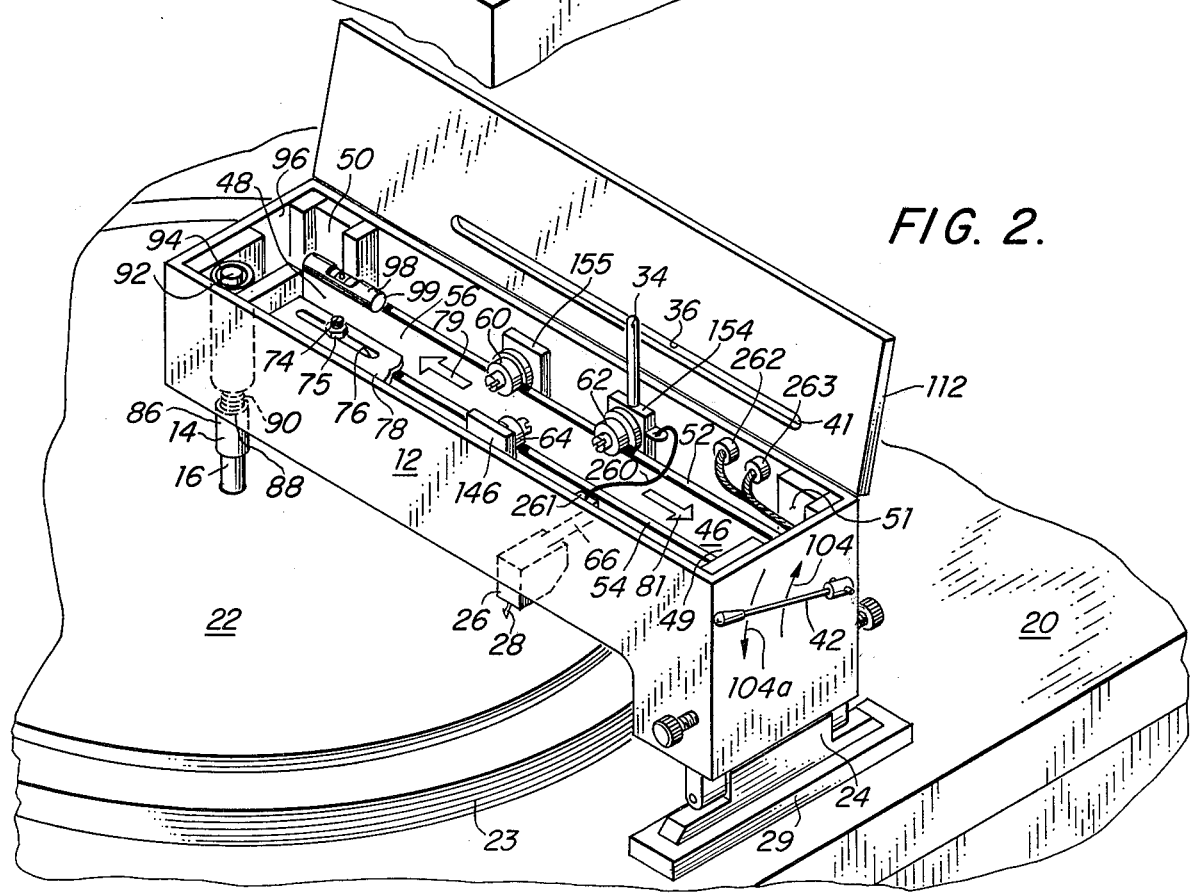
FIG. 2 is an axonometric view of the mechanism of FIG. 1 with the cover open.
Figure 3:
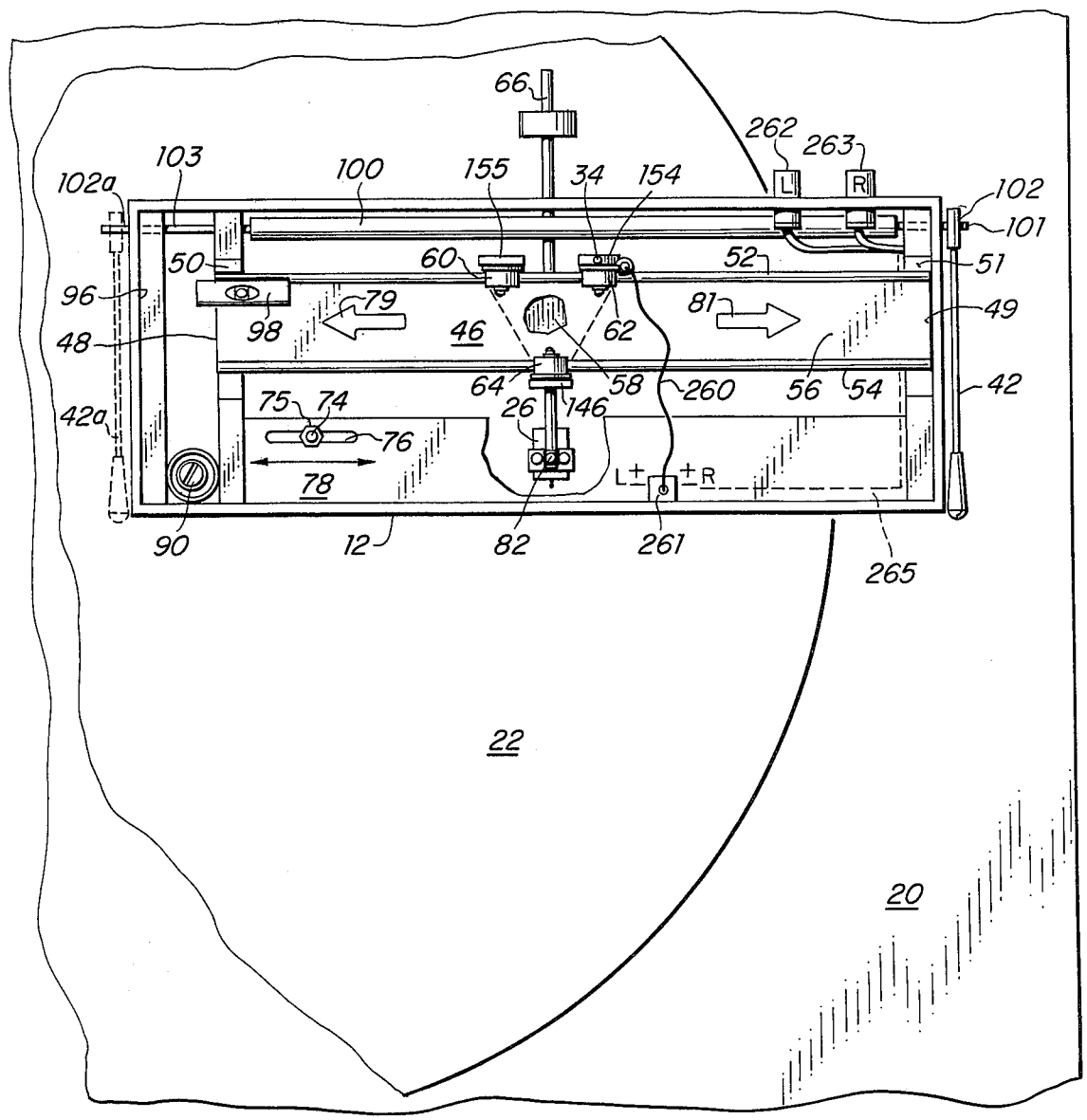
FIG. 3 is a top plan view of the mechanism of FIG. 2.

Referring simultaneously to FIGS. 2 and 3, an elongate generally horizontal track 46 is mounted in housing 12. End 48 is received in recess 50 and is secured by adhesive or other fastening means. Rubber or flexible material may be used to isolate the carriage and cartridge from vibrations. End 49 is similarly mounted in recess 51. Track assembly 46 includes parallel tracks 52 and 54, and a reinforcing spacer 56. Carriage 58 is suspended below track assembly 46 by carriage support members 155, 154 and 146, which include bearings 60, 62 and 64, respectively. Bearings 60 and 62 ride on rearward track 52 and bearing 64 rides on forward track 54 in the direction of arrows 79 and 81. Tone arm 66 is mounted to carriage 58 and connects to cartridge 26 having a stylus 28. As stylus 28 engages the groove of record 22, it, cartridge 26, and tone arm 66 are driven toward spindle 16. Carriage 58 is accordingly driven in the direction of arrow 79 toward inner end 48 of track 46.

Spindle locator 14 has a bore 86 in end 88, which receives the phonograph spindle 16. Threaded end 90 of spindle locator 14 is screwed in or out of the threaded bore 92 of receptacle 94 attached to housing 12, thereby adjusting the height of inner end 96 of housing 12 and consequently end 48 of track assembly 46. This enables housing 12 and track assembly 46 to be adjusted horizontally and parallel with the record 22.

Spindle locator 14, FIGS. 13, may include a centering bore, for example cone-shaped base 86a, which automatically self-centers on spindle 16 whether it be round, 16a, tapered, 16b, or rounded and conical, 16c. Alternatively, spindle 14, FIG. 14, may include in bore 86b inner 180 and outer 182 races with ball bearings 184 between them. The circular opening 186 in inner race 180 automatically self-centers on various shapes of spindles, e.g. 16a, 16b, 16c. This assures the linear tracking of the tone arm directly along the radius of the turntable.

Figure 4:
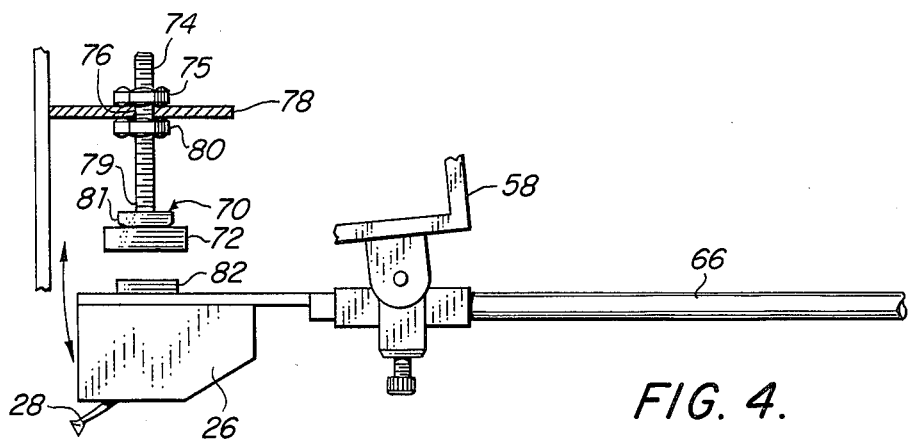
FIG. 4 is a side elevational plan view of the magnetic pick-up means of the mechanism of FIG. 3.

Spirit level 98 may be secured, such as by an adhesive or other means longitudinally oriented along spacer 56 proximate tracks 52 or 54. End 99 of level 98 or other means stops roller 64, and thus carriage 58, when they reach inner end 48 of track assembly 46. Either with or without level 98 other stop means may be used. Magnetic pick-up element 70, FIGS. 3 and 4, includes threaded member 74 which extends through slot 76 of a tab 78 which projects from housing 12. Threaded member 74 is secured therein by a nut 75. Lower end 79 of member 74 has a flange 81 to which is attached a magnet 72. Member 74 also has a nut 80 bearing against the bottom of tab 78. By loosening nut 80, magnet 72 can be adjusted and by tightening nuts 75 and 80 magnet 72 is permanently fixed. When cartridge 26 is at a point directly underneath magnet 72 (the inner end of the record) the magnet will attract a steel or iron slug 82 which is located on tone arm 66 above cartridge 26. Stylus 28 will thus be raised from the record.

Carriage return tab 34, FIG. 2, is merely an extension of carriage support member 154, but may also be an extension of carriage support members 146 or 155. Tab member 34 protrudes through slot 36. Manually pushing or sliding tab 34 in the direction of arrow 81 enables carriage 58 to be returned to end 49 of track assembly 46, thus positioning stylus 28 at the outer edge of record 22. Also, tab 34 may be used to position stylus 28 over any chosen portion of record 22 for cueing.

Figure 5:
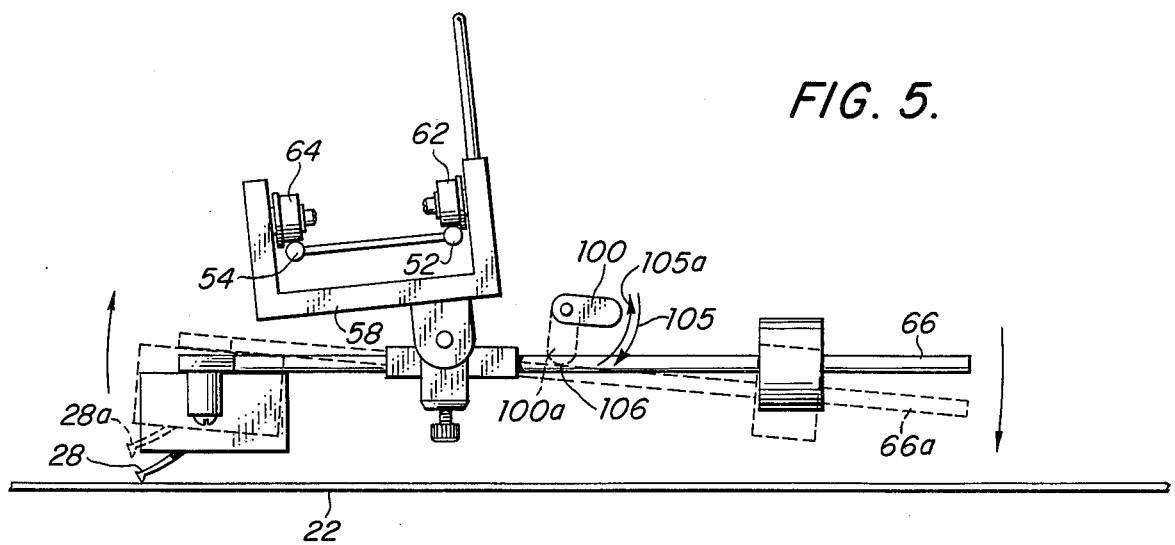
FIG. 5 is a side elevational cross-sectional view showing the action of cam means on the tone arm of the mechanism of FIG. 2.

Camming member 100, FIGS. 3 and 5, extends the length of housing 12, passing above tone arm 66 and is pivotally mounted at 103 and 101. Member 100 connects with actuator arm 42 at 102. Alternatively, member 100 may connect with actuator arm 42a at 102a. By rotating actuator arm 42 in the direction of arrow 104, FIGS. 1 and 2, member 100 rotates in the direction of arrow 105, FIG. 5, to phantom position 100a. This rotation causes cam member 100 to bear on tone arm 66 at 106, moving the tone arm to phantom position 66a. Stylus 28 is consequently lifted from the record to phantom 28a. Rotating arm 42 in the direction of arrow 104a, FIGS. 1 and 2, causes the cam member to rotate in the direction 105a, FIG. 5, from engaged phantom position 100a to disengaged position 100. The tone arm moves from 66a to 66 and the stylus thus lowers from the raised position 28a to the lowered position 28. In this position cam 100 does not bear on or interfere with tone arm 66.

Figure 6:
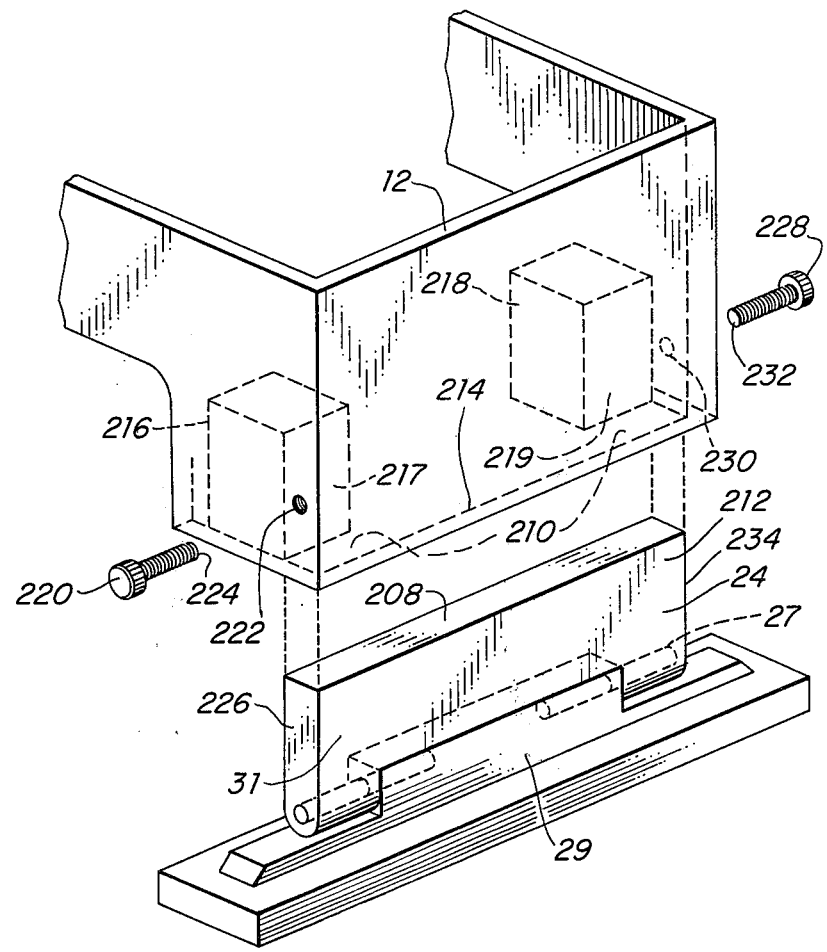
FIG. 6 is an axonometric view of the means for mounting the housing to the turntable of the mechanism of FIG. 1.

Means for mounting to the turntable, pedestal 24, FIG. 6, has an uppr plate 31 attached by hinge 27 to base member 29, which may be magnetic or include other means appropriate to mount to the turntable. End 208 is received in slot 210 in the bottom of housing 12. Plate 31 may slide in slot 210: face 212 engages the inner face of wall 214 and the back face of plate 31 engages blocks 216 and 218 at faces 217 and 219. Means 24 may thus be vertically adjusted to accommodate various turntable heights. tightening set screw 220 in hole 222 causes end 224 to bear on side 226 of plate 31 and, similarly, end 232 of set screw 228 in hole 230 upon tightening bears on side 234 of plate 31. This fixes pedestal 24 vertically in position. Raising and lowering inner end 96 in the direction of arrows 25 and 25a, respectively, FIG. 1, causes plate 31 to pivot about base 29.

Carriage 58, FIG. 7, has bearings 60 and 62 riding on rear track 52 and bearing 64 riding on front track 54. Carriage 58 has pivot support members 114 and 116. Pivot means 118 is pivotally connected to member 114 at 119, and is similarly connected to member 116 at 117. Releasable tone arm locator 120 FIG. 7A has a hole 122 by which it is mounted to pivot 118. Tone arm locator 120 has a longitudinal opening 124 which is keyed to the shape of block member 126 of tone arm 66, thus preventing lateral or rotational movement by tone arm 66 but allowing longitudinal movement by arm 66. Tightening set screw 128 causes end 129 to bear on surface 131 of block 126, thus fixing arm 66 longitudinally and forcing surface 131a to bear against the bottom of pivot 118 at 118a, thereby automatically positioning cartridge parallel to record surface 22. Screw 128 is loosened to permit adjustment of of arm 66. Tone arm 66 has a counterweight 130 which may be adjusted by sliding along arm 66. Cartridge 26 is connected to end 132 of arm 66 and stylus 28 is connected thereto. Return tab member 34 is an extension of carriage support member 154. Pivot 118 allows end 132 of arm 66 to vertically move in the direction of arrows 67 and 67a.

Tracks 52, 54 may be circular in cross section, FIG. 8, and may have a plated glass surface 52' on a core 52" of other material or may be solid glass as indicated at 54. Rear track 52 is raised higher than forward track 54, FIG. 8. The entire track assembly including spacer 56 is laterally inclined at angle 134. Bearing 62 bears on track 52 at contact point 136. Bearing 64 bears on track 54 at point 138. Note that bearing 60 is obscured by bearing 62. Axle screw 142 extending through axial hole 140 of bearing 64 and hole 144 of carriage support member 146 mounts member 146 onto bearing 64. Likewise, axial hole 148 of bearing 62 receives an axle screw 150 which in turn extends through hole 152 of carriage support member 154. Bearings 60, 62, and 64 are thus able to rotate about their axes and ride on tracks 54 and 52 in the direction of arrows 79 and 81. Bearing 62, FIGS. 2 and 3, has a flange 156 and bearing 64 has a flange 158. These flanges are spaced farther apart than are tracks 52 and 54. The lateral component of the force resulting from the tilt angle 134 causes flange 156 to bear on track 52 at 157 and flange 158 to not bear on track 54, causing a gap 160. Roller 60 and its flange behave the same as roller 62 and flange 156. Alternatively, if diamond-shaped tracks 52a, 54a are used, FIG. 9, the mechanism 10 operates the same as in FIG. 8. In FIG. 9 similar parts are given like numbers accompanied by a lower case a.

Linear gauge 162, FIG. 10, has hole 164 which fits snugly over spindle 16. Gauge 162 is placed over record platter 23 with hole 164 onto spindle 16. Line 168 on gauge 162 describes a linear or radial path from spindle 16. The tone arm 66 is adjusted as in arrow 171, FIG. 10, so that the stylus tip aligns with line 168 all along its length.

In operation, to set up a new cartridge, gauge 162 sets the linear path 170 and tone arm 66 is longitudinally adjusted, 171, in tone arm locator 120 so that stylus 28 engages the groove 30 of record 22 along linear path 170. Pivoting actuator arm 42 in direction 104 causes cam member 100 to bear on tone arm 66 at 106. Arm 66 pivots to position 66a, causing stylus 28 to rise, 28a. Tab member 34 is manually moved to end 41 of slot 36 so that stylus 28 is positioned over the outside edge of record 22. Actuator arm 42 is pivoted in the direction of arrow 104a, causing cam member 100 to disengage tone arm 66, which in turn pivots in the direction of arrow 67a causing stylus 28 to engage groove 30 of record 22. The spiraling groove 30 draws stylus 28 and tone arm 66 toward spindle 16 in the direction of arrow 79. Arm 66 is carried by carriage 58 on bearings 60, 62, and 64 over track assembly 46 in the direction of arrow 79. The tilt caused by shim 44 and inserted under turntable 20 overcomes any residual friction within the bearings, between the bearings 60, 62 and 64 and tracks 52 and 54. The force which the groove exerts on the stylus pulls arm 66 in the direction of record rotation, causing flange 156 and the flange of roller 60 to bear on rod 52 while flange 158 rides free of rod 54. This insures linear alignment of carriage 58 while it travels on track assembly 46. When stylus 28 reaches the end of record 22, magnet 72 attracts slug 82 and arm 66 is again raised in the direction of arrow 67. The record may be changed by raising inner end 96 in the direction of arrow 25. Pedestal 24 pivots on hinge 27 but remains secured to the turntable 20. Housing 12 is thereby raised toward the vertical position, thus allowing records to be removed from or placed on the spindle 16 without removing mechanism 10 from the turntable 20. When a new record has been placed in position, inner end 96 is lowered in the direction of arrow 25a, pedestal 24 pivots on hinge 27, and spindle locator 14 once again engages with spindle 16. Without further adjusting, stylus 28 is immediately ready to describe a linear path 170 across the newly inserted record.

Wire 260, FIG. 2, extends from cartridge 26 to the wall of housing 12 where it attaches connector 261. An electrical wire continues, such as through conduit 265, to connector 262 and 263, which receives a mating connector from an audio system.

Other embodiments will occur to those skilled in the art and are within the following claims.

What is claimed is:

1. A linear-tracking tone arm mechanism for a record turntable, said mechanism comprising:
    a housing having means for engaging the spindle of a turntable and means for mounting to the turntable which supports said housing above the turntable;
    an elongate generally horizontal track assembly mounted to said housing and extending longitudinally in the direction generally between said means for engaging and said means for mounting and having a forward track and a parallel rearward track horizontally spaced from and slightly higher than said forward track;
    a carriage including first and second rear bearings having a first surface for engaging the top of said rear track and a second surface for engaging the side of said rear track opposite said forward track and a forward bearing having a first surface for engaging the top of said forward track and a second surface for engaging the side of said forward track opposite said rear track; said second surface of said rear bearings being spaced from said second surface of said forward bearing a greater distance than said forward track is spaced from said rearward track to enable said second surface of said forward bearing to remain clear of said forward tracks;
    a tone arm; and
    means for mounting said tone arm to said carriage.

2. The mechanism of claim 1 in which said bearings and said tracks are shaped and arranged to provide line contact between them.

3. The mechanism of claim 1 in which said tracks have a circular cross section.

4. The mechanism of claim 1 in which said tracks have a square cross section.

5. The mechanism of claim 1 in which said tracks are composed of glass, at least on their bearing portions.

6. The mechanism of claim 1 in which said first and second surfaces contact said tracks approximately orthogonally to one another.

7. The mechanism of claim 1 in which said tracks are glass rods and said track assembly further includes a spacer for mounting said rods.

8. The mechanism of claim 1 in which the means for mounting the tone arm includes releasable tone arm locator means to enable the position of said tone arm to be adjusted in the direction lateral to said track assembly.

9. The mechanism of claim 8 in which said tone arm locator means includes a longitudinal opening conforming to said tone arm for snugly gripping said tone arm to prevent lateral rotational motion of said tone arm and allowing longitudinal motion.

10. The mechanism of claim 8 in which said tone arm includes a flat surface and a bearing area and said releasable tone arm locator includes a pivot shaft and a set screw for bearing on said bearing area and urging said flat surface against said pivot shaft.

11. The mechanism of claim 1 in which said means for engaging is adjustable to make parallel said track assembly with the record.

12. The mechanism of claim 1 in which said housing has a level indicator.

13. The mechanism of claim 1 in which said means for mounting to the turntable includes a magnetic pedestal.

14. The mechanism of claim 1 in which said means for mounting to the turntable is vertically adjustable to accommodate various heights of the turntable rotatable portion.

15. The mechanism of claim 1 further including shim means for raising the outer edge of the turntable so that the end of said track assembly proximate said means for mounting to the turntable is higher than the end proximate said means for engaging the spindle and parallel to the turntable.

16. The mechanism of claim 1 further including carriage stop means at the inner end of the track proximate said means for engaging said spindle.

17. The mechanism of claim 1 further including pick-up means proximate the stylus end of said tone arm at the inner end of its track for lifting said stylus end of said tone arm to remove its stylus from the record groove.

18. The mechanism of claim 17 in which said pick-up means includes a pair of magnetic elements, one element on said tone arm and the other on said housing.

19. The mechanism of claim 1 further including a tab member extending from said carriage for manually moving said carriage.

20. The mechanism of claim 1 further including cam means in said housing extending along said track assembly spaced from said rear track and proximate said tone arm to raise and lower the stylus end of said tone arm at any point along its path.

21. The mechanism of claim 1 in which said carriage means includes pivot means for enabling raising and lowering of the stylus end of said tone arm.

22. The mechanism of claim 1 in which said means for mounting to the turntable includes hinge means for pivotally raising or lowering the inner end of said housing while said means for mounting remains mounted to the turntable for maintaining alignment of said housing with said turntable during record removal and placement.

23. The mechanism of claim 1 in which said means for engaging the spindle includes means for self-centering said means for engaging the spindle with the spindle.

24. The mechanism of claim 1 in which said means for engaging the spindle when positioned on a turntable spindle provides exact location of said track assembly and tone arm, thereby insuring the linear tracking mode.

* * * * *